No. 770,092. PATENTED SEPT. 13, 1904.
A. S. McALLISTER.
ALTERNATING CURRENT MACHINERY.
APPLICATION FILED MAR. 23, 1904.
NO MODEL. 2 SHEETS—SHEET 1.
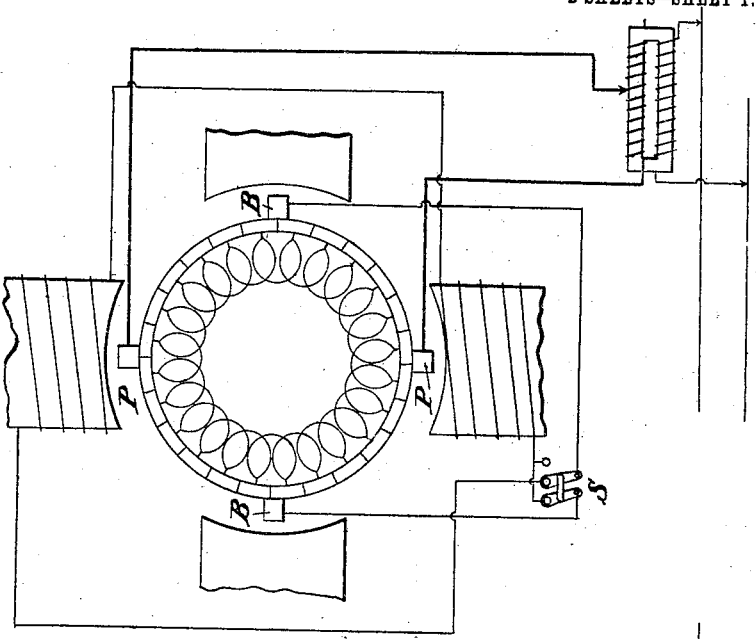
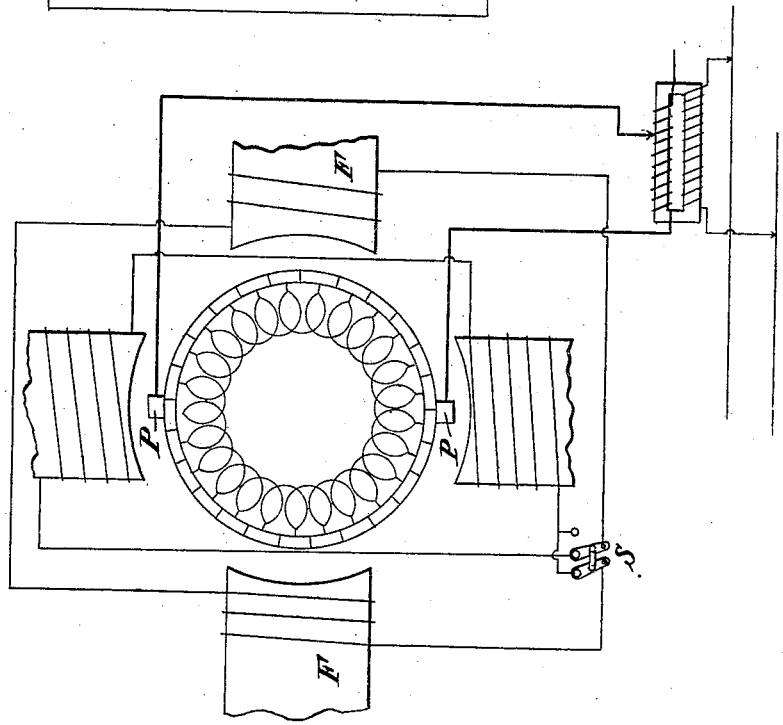
WITNESSES:
A. T. Austin
H. F. Bradley
INVENTOR
Addams Stratton McAllister
BY
James Hamilton
ATTORNEY No. 770,092. PATENTED SEPT. 13, 1904.
A. S. McALLISTER.
ALTERNATING CURRENT MACHINERY.
APPLICATION FILED MAR. 23, 1904.
NO MODEL. 2 SHEETS—SHEET 2.
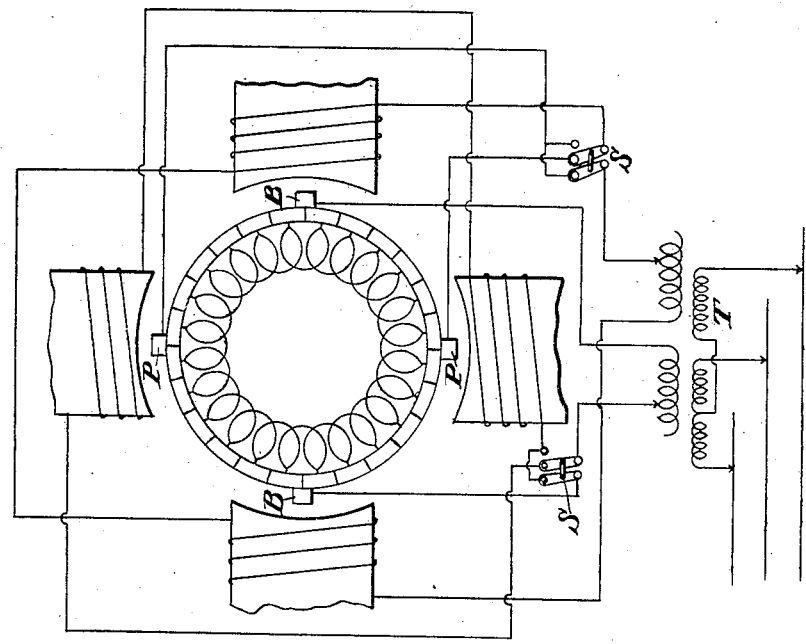
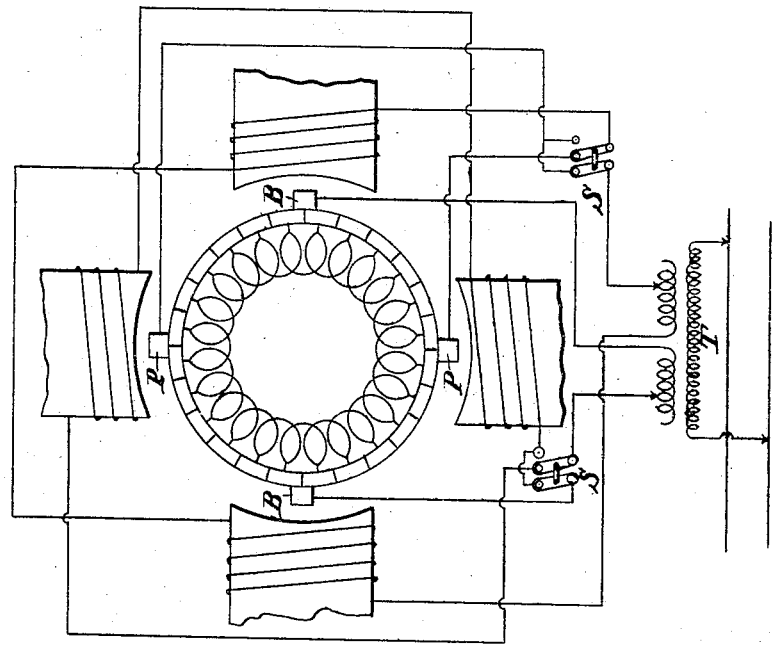

No. 770,092.

Patented September 13, 1904.

UNITED STATES PATENT OFFICE.

ADDAMS STRATTON McALLISTER, OF ITHACA, NEW YORK.

ALTERNATING-CURRENT MACHINERY.

SPECIFICATION forming part of Letters Patent No. 770,092, dated September 13, 1904.

Application filed March 23, 1904. Serial No. 199,578. (No model.)

*To all whom it may concern:*

Be it known that I, ADDAMS STRATTON MC-ALLISTER, a citizen of the United States, and a resident of Ithaca, in the county of Tompkins and State of New York, have invented certain new and useful Improvements in Alternating-Current Machinery, of which the following is a specification, reference being had to the accompanying drawings, forming part of the same.

My invention relates to improvements in alternating-current machinery; and the object of my invention is to provide a variable-speed motor of the commutator type possessing the mechanical characteristics of the direct-current series motor capable of overcoming in its operation difficulties encountered with other variable-speed alternating-current motors and susceptible of use at will as either a motor or generator.

In my application, Serial No. 193,709, filed February 15, 1904, I have shown and described a single-phase alternating-current motor having magnetic cores placed both in line with and in mechanical quadrature to the axial brush-line of the motor, the flux in the latter core being produced by current flowing in a coil wound upon the core material, such current being derived from the electromotive force generated in a coil located upon the former magnetic core, as diagrammatically indicated in Figure 1. In the application above referred to I have shown how such a machine may be operated as either a generator or a motor and have discussed at length the advantages of such method of construction and the results obtained in the operation of the motor thus constructed. My present invention relates to certain modifications of this construction by which the performance of the machine may be modified, its operation improved, and its characteristics retained when employed for polyphase work.

Fig. 1 is a diagrammatic representation of the machine described in my aforesaid application. Fig. 2 is a modification thereof hereinafter described, and Figs. 3 and 4 represent a double series-wound field composite armature-machine.

In Fig. 2 is shown a method by which the auxiliary winding on the quadrature field-core (shown in Fig. 1) may be dispensed with and the armature-winding used as the coil through which flows the current produced by the electromotive generated in the axial brush-line field-winding.

It will be evident to those skilled in the art to which this invention applies that except for the hysteretic angle of time displacement of the magnetism from the current producing it the flux along the brush-line B B will be in time phase with the current in the secondary circuit of the motor and in this respect will be but slightly affected by the motion of the armature. The current which flows in the primary circuit by way of the brushes P P, as is true in transformers, will be in approximate time-phase opposition to the flux along the brush-line B B. Hence there will be produced a torque which retains a relatively constant direction with the simultaneous reversal of the flux and the current. The value of this torque will vary approximately as the square of the current. When the rotor travels at any speed, there will be produced at the brushes B B an electromotive force proportional to the product of the speed and the flux along the brush-line P P and in time phase with this flux. This electromotive force will be in time-phase position to decrease the apparent impedance of the armature position of the secondary field-circuit at B B and causes a decrease of the electromotive force required to be generated in the field-coil along the line P P, and hence with the increase of speed the apparent reactance of the windings is lessened. It will also be evident to any one skilled in this art that at any speed there will be generated at P P an electromotive force proportional to the product of the speed and the flux along the line B B. This electromotive force will be in time phase with the flux at B B, and hence, as indicated above, will be in time-phase opposition to the current supplied the brushes at P P, or to maintain a certain current in the secondary circuit as the speed increases requires an increase in the power component of the applied electromotive force. Hence the apparent resistance of the motor-circuit has been increased. From what has been stated above it follows that an increase in speed is accompanied simultaneously with a decrease of the apparent reactance and an increase of the apparent resistance of the windings. Hence with increase of speed of the armature the power factor of the motor throughout its operating range continually approaches unity. This is no mere theoretical deduction, but has been amply proved by me in tests with motors constructed as above indicated. I have found that the motor as here connected will operate as a generator when driven against its natural tendency to rotation and that the machine thus operated will excite its own field magnets independently of any connection to the source of supply of current.

An inspection of Fig. 2 will reveal the fact that the secondary circuit is closed upon itself and that this circuit considered independently of the external circuit (through P P) constitutes the field and armature circuit of a series-wound machine. When this machine is driven at a speed in a negative direction and of sufficiently high value, the slight remnant magnetism in the poles along the brush-line P P causes the generation of an electromotive force in the armature along B B, which sends through the field-coils a current the magnetomotive force of which assists the magnetism in the field-cores and the machine "builds up," as would a direct-current series-wound generator on short circuit. The strength of this generator action depends upon the speed of the armature and inversely on the resistance of the windings of the machine, and it may be dampened to any desired extent by the employment of the proper amount of additional resistance. At any certain speed in a positive direction of the rotor this action may be brought into play by the relative reversal of the interconnection of the field and armature circuits by the use of the switch $s$, Fig. 2. Its availability furnishes a ready emergency-brake in traction-work. Independently of the action just described the motor when driven against its torque may be caused to feed alternating-current energy back to the supply-line if the brushes P P be kept in contact with the commutator and in connection with the source of supply. This latter action is attributable to the relative reversal of the power component of the apparent motor impedance with speed in a negative direction. Since the speed component of the apparent resistance becomes negative with rotation in a negative direction, at a certain value of speed in such direction the negative value of apparent resistance due to speed is sufficient to counterbalance the normal stationary resistance effect of the windings of the machine, rendering the total power component of the motor impedance zero, and therewith the power supplied to the motor becomes zero also, as has been fully discussed in my said application. The latter alternating-current effect by proper proportion of the damping resistance may be made to neutralize completely the direct-current-generator action above set forth, or the two may be caused to take place simultaneously, as tests have conclusively proved and as will be understood by one skilled in this art.

If instead of displacing field-coils shown at F F in Fig. 1 by a circuit including the brushes B B in Fig. 2 both the field-coils and the brush-armature circuits be retained simultaneously, there will be obtained the double series-wound field composite armature-motor, (shown in Figs. 3 and 4,) the operation of which is as follows: Current which enters the armature by way of brushes B B traverses only the field-coils which produce magnetism along the brush-line P P. Hence with this circuit alone completed the machine operates as a plain alternating-current series motor. Obviously the same remarks apply when the circuit through P P and the corresponding field-coils alone is completed. If the torque due to the first connection mentioned above be in the same direction as that due to the second connection, then when both connections are made simultaneously there will result a torque which will be the sum of the individual torques. It will be observed that the current which enters the armature by one set of brushes in no way affects the current entering by way of the other set of brushes, since the points of entrance are in each case at zero potential one with reference to the other, and the copper loss within the armature due to the one current is independent of that due to the other. Thus if R be the resistance of each quarter of the armature-winding, $I_p$ be one current, and $I_b$ the other current then the instantaneous losses in the several quarters will be as follows:

$$\left[\frac{(I_b + I_p)}{2}\right]^2 R + \left[\frac{(I_p + I_b)}{2}\right]^2 R + \left[\frac{(I_p - I_b)}{2}\right]^2 R + \left[\frac{(I_b - I_p)}{2}\right]^2 R$$

or $I_p^2 R + I_b^2 R$, or equal to the sum of the losses due to the two currents considered separately. The discussion here given applies equally well when the current through one set of brushes is in time phase with that through the other or when these currents are displaced in time by ninety electrical degrees. Thus the source of energy may be single phase, as shown in Fig. 3, or polyphase, as shown in Fig. 4.

I have found that the current through one circuit may be of any phase or any frequency, alternating or direct current, independently of the current in the other circuit and that in each case the resultant torque is the sum of the individual torques. Each individual circuit of the composite motor will in any case present the characteristics of a series motor independently of the operation of the other circuit of the motor. When fed with two-phase currents, as shown in Fig. 4, the machine has the series-motor characteristics and constitutes a balanced load on the polyphase circuit. It is therefore especially adapted for elevator or similar service where the use of a single-phase motor produces an unbalance on the polyphase lighting-mains and renders the service unsatisfactory. When operating as a composite alternating-current motor, each component motor when driven against its torque acts as an alternating-current generator and returns energy to the supply system, this action being independent of the similarity of phase or frequency of the current-supply of the two component motors.

It will be obvious to all skilled in this art that instead of the projecting poles (shown in the various figures for sake of clearness of illustration) properly-laminated ring-cores, with coils so connected as to produce definite magnetic poles when current flows therein, may conveniently be used, and this latter construction is considered advantageous for structural reasons. When a ring-core is used with the motor shown in Fig. 4, operated by two-phase currents, the flux due to the one current combines with that due to the other current to produce the so-called "revolving field." The motor in no way depends upon the revolving field for its operation. Indeed, the direction of rotation of the armature is independent of that of the revolving field, as will be appreciated when it is remembered that reversing simultaneously both the armature and field circuits of one component motor reverses the direction of the revolving field, but has no effect on the direction of the torque produced by this or the other component motor. However, when the armature and the revolving field travel in the same direction the armature-iron loss disappears entirely when its speed is synchronous, as determined by the ratio of the frequency to the number of poles. The armature may be caused always to travel in the direction of the revolving field if with the reversal of torque the revolving field is also reversed, which condition will be fulfilled when the change in the direction of rotation of the composite motor is obtained by reversing the field of one component motor and the armature-circuit of the other, as shown by the double-throw switches s s, Fig. 4.

In the drawings it will be understood by all skilled in this art that the projecting poles represent merely core material in position to hold windings, while a uniform outer magnetic core is assumed to exist in reality. Though in each of the figures more than two projecting poles are shown, each machine, as diagrammatically represented, is of the bipolar type. It will be obvious, however, that machines of any number of poles come within the scope of my invention and that in each case properly-slotted ring-cores, with coils wound according to well-established practice with alternating-current machinery, may be used and that any convenient type of closed-coil direct-current armature-winding may be used with motors of my invention.

I believe myself to be the first to discover and apply the principles involved in the operation of the various modifications of the motors described in this application. I wish to be understood as claiming, broadly, all motors constructed on these principles to come within my invention.

What I claim is—

1. An alternating-current machine capable of use either as a motor or a generator and comprising the combination of a source of alternating-current supply; a coil-carrying rotor provided with a commutator; brushes which connect said commutator electrically with said source; field-coils; and other brushes which connect said field-coils with said commutator.

2. An alternating-current machine capable of use either as a motor or generator and comprising the combination of a source of alternating-current supply; a coil-carrying rotor provided with a commutator; brushes which connect said commutator electrically with said source; field-coils; a switch in circuit with said coils; and other brushes which connect said field-coils with said commutator.

3. An alternating-current machine capable of use either as a motor or a generator and comprising the combination of a source of alternating-current supply; a coil-carrying rotor provided with a commutator; brushes which connect said commutator electrically with said source; field-coils in line with said brushes; and other brushes which connect said field-coils with said commutator and which are in quadrature with the first-named brushes.

4. An alternating-current machine capable of use either as a motor or a generator and comprising the combination of a source of alternating-current supply; a coil-carrying rotor provided with a commutator; a circuit including brushes and connecting said source with said commutator; field-coils; and a second circuit including brushes and connecting said commutator with said field-coils; said circuits being electrically distinct.

5. An alternating-current machine capable of use either as a motor or a generator and comprising the combination of a source of alternating-current supply; a coil-carrying rotor provided with a commutator; a circuit including brushes and connecting said source with said commutator; field-coils; and a second circuit including brushes and connecting said commutator with said field-coils; a current-reversing device in said second circuit; said circuits being electrically distinct.

6. An alternating-current machine capable of use either as a motor or as a generator, and comprising the combination of an external circuit-carrying alternating current and electrically connected by a set of brushes with the commutator of a coil-carrying rotor; said set of brushes; said coil-carrying rotor provided with a commutator; a set of field-magnets in said circuit; a second set of field-magnets interconnected through a second set of brushes in electrical connection with said commutator; and said second set of brushes.

7. An alternating-current machine capable of use either as a motor or as a generator, and comprising the combination of an external circuit-carrying alternating current and electrically connected by a set of brushes with the commutator of a coil-carrying rotor; said set of brushes; said coil-carrying rotor provided with a commutator; a set of field-magnet core-sections; a set of field-magnets interconnected through a second set of brushes in electrical connection with said commutator; and said second set of brushes.

8. An alternating-current machine capable of use either as a motor or as a generator, and comprising the combination of an external circuit-carrying alternating current and electrically connected by a set of brushes with the commutator of a coil-carrying rotor; said set of brushes; said coil-carrying rotor provided with a commutator; a set of field-magnet core-sections; a set of field-magnets in mechanical quadrature with said core-sections and interconnected through a second set of brushes in electrical connection with said commutator; and said second set of brushes.

9. An alternating-current machine capable of use either as a motor or as a generator, and comprising the combination of a circuit containing a source of alternating current; a set of field-magnets in said circuit; a set of brushes which close said circuit through a coil-carrying rotor provided with a commutator; said coil-carrying rotor; a second circuit containing a source of alternating-current supply; a second set of field-magnets in said second circuit; a second set of brushes which close said second circuit through said rotor; and current-reversing devices in each of said circuits.

10. An alternating-current machine capable of use either as a motor or as a generator, and comprising the combination of a coil-carrying rotor provided with a commutator; a set of brushes in electrical connection with said commutator; a set of field-magnets in circuit with said brushes; a source of alternating-current supply in circuit with said brushes; a second set of brushes in electrical connection with said commutator; and a second set of field-magnets in circuit with said second set of brushes and in mechanical quadrature with said set of field-magnets.

11. An alternating-current machine capable of use either as a motor or as a generator, and comprising the combination of a coil-carrying rotor provided with a commutator; a set of brushes in electrical connection with said commutator; a set of field-magnets in circuit with said brushes; a second set of brushes in electrical connection with said commutator; a second set of field-magnets in circuit with said second set of brushes; and a source of alternating-current supply for said circuits.

In testimony whereof I hereunto set my hand, in the presence of two witnesses, at said Ithaca, this 21st day of March, 1904.

ADDAMS STRATTON McALLISTER.

Witnesses:
FREDERICK BEDELL,
R. S. PATTISON.